US007339283B2

(12) United States Patent
Gvelesiani

(10) Patent No.: US 7,339,283 B2
(45) Date of Patent: Mar. 4, 2008

(54) ELECTRONIC LOAD REGULATOR

(75) Inventor: Viktor Gvelesiani, London (CA)

(73) Assignee: ZTR Control Systems, Minneapolis, MN (US)

( * ) Notice: Subject to any disclaimer, the term of this patent is extended or adjusted under 35 U.S.C. 154(b) by 91 days.

(21) Appl. No.: 11/412,488

(22) Filed: Apr. 27, 2006

(65) Prior Publication Data

US 2007/0252561 A1    Nov. 1, 2007

(51) Int. Cl.
*F25B 1/00* (2006.01)
*F02D 28/00* (2006.01)
(52) U.S. Cl. ..................................... 290/1 R; 324/209
(58) Field of Classification Search ................ 290/1 R, 290/1 A, 7, 39; 324/209
See application file for complete search history.

(56) References Cited

U.S. PATENT DOCUMENTS

| 3,707,950 A | 1/1973 | Schlimme ..................... 123/32 |
| 4,460,834 A | 7/1984 | Gottfried ..................... 307/64 |
| 4,462,376 A | 7/1984 | Ripper ....................... 123/571 |
| 4,538,581 A | 9/1985 | Hakansson .................. 123/502 |
| 4,621,503 A * | 11/1986 | Woods et al. .............. 62/228.3 |
| 4,643,146 A | 2/1987 | Spriessler .................... 123/357 |
| 4,649,878 A * | 3/1987 | Otobe et al. ........... 123/339.18 |
| 4,782,804 A | 11/1988 | Lehmann ..................... 123/365 |
| 5,156,531 A | 10/1992 | Schmid ....................... 417/295 |
| 5,313,924 A | 5/1994 | Regueiro ..................... 123/456 |
| 5,345,916 A | 9/1994 | Amann ....................... 123/506 |
| 5,591,021 A | 1/1997 | Guentert ..................... 417/494 |
| 5,771,686 A | 6/1998 | Pischinger ................... 60/274 |
| 5,771,857 A | 6/1998 | Willi ......................... 123/305 |
| 5,875,413 A * | 2/1999 | Vinci .......................... 702/91 |
| 5,929,609 A * | 7/1999 | Joy et al. ...................... 322/25 |
| 6,172,428 B1 * | 1/2001 | Jordan ...................... 290/40 C |
| 6,408,625 B1 | 6/2002 | Woon .......................... 60/608 |
| 6,691,668 B2 | 2/2004 | Liberatore ................. 123/198 |
| 2005/0046195 A1 | 3/2005 | Kousoulis .................... 290/44 |
| 2005/0109076 A1 | 5/2005 | Butler ........................ 417/321 |

* cited by examiner

*Primary Examiner*—Nicholas Ponomarenko
(74) *Attorney, Agent, or Firm*—Vidas, Arrett & Steinkraus, P.A.

(57) ABSTRACT

An electronic load regulation system for a locomotive may comprise a solid state replacement for existing electromechanical load regulators that are used to adjust the excitation current in the field windings of the locomotive's generator. A pressure sensor may include a first chamber and a second chamber, each chamber having a pressure switch. The pressure sensor may be installed in place of a prior art vane motor and may connect to the existing governor hydraulic output. The pressure switches send status data to an electronic load regulator circuit that may replace a prior art rheostat. The electronic load regulator may increase or decrease the excitation current depending upon the status data received from the pressure sensor.

16 Claims, 9 Drawing Sheets

ELECTRONIC LOAD REGULATOR

BACKGROUND OF THE INVENTION

This invention relates generally to locomotives and more specifically to an electronic load regulator for use in locomotives. In some embodiments, the invention comprises an electronic load regulation system that may be used in place of prior art mechanical load regulation systems.

Many existing locomotives use prime mover, such as a diesel engine, to turn an electric generator. The electricity produced is supplied to electric traction motors that are used to turn the wheels and propel the locomotive. A first significant factor that impacts the output of the electric generator is the rotating speed of the engine. A higher rotational engine speed causes the generator to output a greater amount of horsepower. A second significant factor is the amount of excitation current in the field windings of the generator. A higher current causes the generator to output a greater amount of horsepower.

The rotating speed of the engine is generally controlled directly by an engineer via the throttle control. A load regulator system then prevents the engine from being overloaded or underloaded by regulating the excitation current in the field windings of the generator at all throttle positions.

FIG. 1 shows a prior art mechanical load regulator system 5 having a large rheostat 6 driven by a hydraulically operated vane motor 10. The input side 7 of the rheostat 6 is connected to the voltage/current source. The output side 8 of the rheostat 6 is connected to the field windings of the electric generator.

Inlets/outlets 11 of the vane motor 10 receive hydraulic fluid from the engine governor. The engine governor is a complex mechanism designed to regulate engine speed. One of its functions is to control the flow of engine oil to the vane motor 10. The output of the vane motor 10 is connected directly to the rheostat 6. Oil flow through the vane motor 10 in one direction will adjust the rheostat 6 to increase the electrical excitation current present in the generator field windings, while oil flow in the opposite direction will adjust the rheostat 6 to decrease the excitation current present in the generator field windings. Thus, hydraulic output from the engine governor controls the rheostat 6, which in turn controls the excitation current present in the generator field windings.

Some locomotives also include a switcher service circuit 4 capable of bypassing the rheostat 6. Under normal road service operation, the rheostat 10 may provide a smooth ramp up of excitation current, which in turn provides smooth acceleration. Under certain conditions, such as when switching railcars that are attached to the locomotive, a more immediate jolt may be desirable. Thus, a switch 3 may be operated to bypass the rheostat 6 and instead use the switcher service circuit 4, which generally provides a more immediate, higher predetermined amount of excitation current.

Maintenance of a prior art mechanical load regulator system 5 is increasingly difficult and expensive. Opens, shorts and dirt build-up in the rheostat 6 can cause erratic behavior of the locomotive's traction control. Vane motors 10 require maintenance and hydraulic leaks also cause erratic behavior.

There remains a need for a load regulator system that avoids drawbacks associated with prior art mechanical load regulator systems. There remains a need for a load regulator system that can be used in place of prior art mechanical load regulator systems.

All U.S. patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In at least one embodiment, an electronic load regulator system comprises a pressure sensor device arranged to output status data and an electronic load regulator comprising a power input, a status data input and a controlled power output. Status data from the pressure sensor device is provided to the electronic load regulator, which adjusts the controlled power output according to the status data.

In at least one embodiment, the rate of adjustment for the controlled power output may be changed.

In at least one embodiment, the pressure sensor device may receive hydraulic fluid from an engine governor and convert the motion of said hydraulic fluid into electrical status data that is provided to the electronic load regulator.

In at least one embodiment, a method comprises providing a locomotive having an engine governor arranged to operate a prior art load regulator having a vane motor and a rheostat, removing the vane motor and rheostat, and providing and installing a pressure sensor device and an electronic load regulator. The electronic loads regulator is constructed and arranged to adjust an excitation current in the locomotive's electric generator depending on status data received from the pressure sensor device.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

Figure 1:
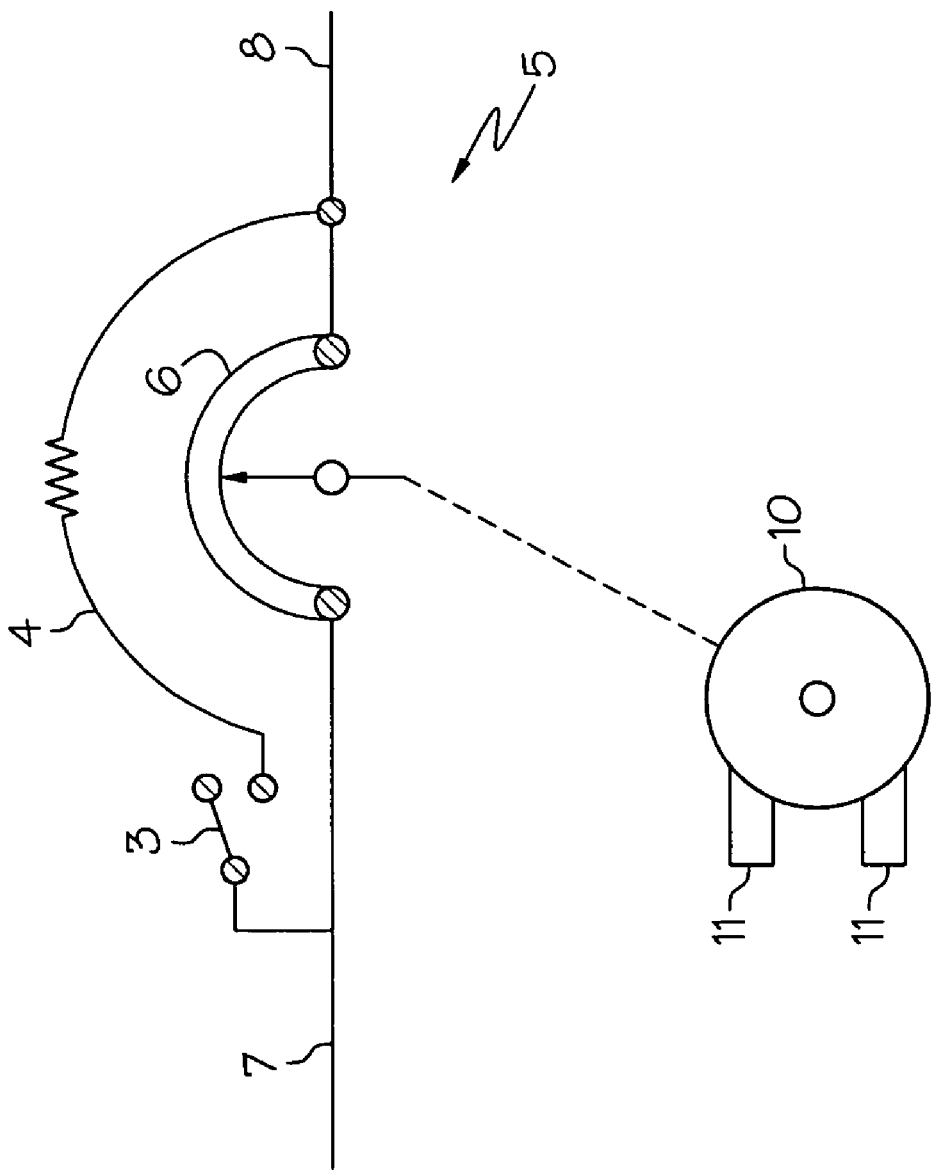
FIG. 1 shows a prior art mechanical load regulator system.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

In some embodiments, the invention comprises a solid state replacement for the prior art hydraulically controlled vane motor and rheostat system. In some embodiments, the inventive generator field control system 20 may connect directly to the existing original equipment in the locomotive.

Figure 2:
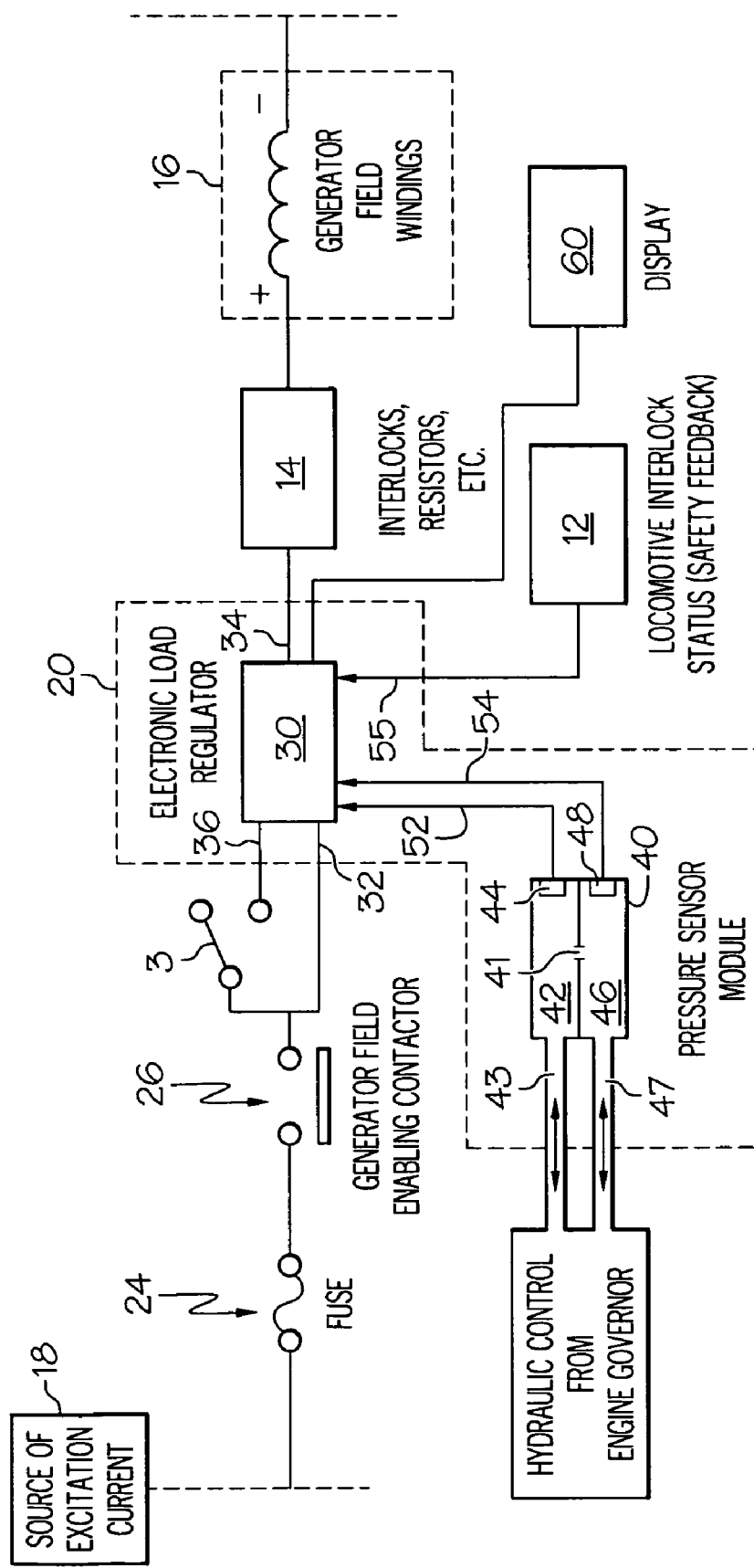
FIG. 2 shows an embodiment of an inventive load regulator system.

FIG. 2 shows an embodiment of a generator field control system 20 comprising an electronic load regulator 30 and a pressure sensor module 40.

In some embodiments, the electronic load regulator 30 may be installed between the voltage/current source 18 and the electric generator field windings 16. The electronic load regulator 30 may have a power input 32 and a controlled power output 34. Status data 52, 54 is provided by the pressure sensor module 40. The amount of electrical current present in the generator field windings 16 is controlled by the electronic load regulator 30, which adjusts the controlled power output 34 based upon the status data 52, 54 provided from the pressure sensor module 40.

The pressure sensor module 40 may comprise a first chamber 42 having a first pressure switch 44 and a second chamber 46 having a second pressure switch 48. A first inlet/outlet 43 in fluid communication with the first chamber 42 may connect to a first hydraulic inlet/outlet controlled by the engine governor, for example an inlet/outlet that formerly connected to one side of the prior art vane motor (see FIG. 1). A second inlet/outlet 47 in fluid communication with the second chamber 46 may connect to a second hydraulic inlet/outlet controlled by the engine governor, for example an inlet/outlet that formerly connected to the other side of the prior art vane motor. A pressure relief aperture 41 may allow a predetermined amount of fluid flow between the first chamber 42 and the second chamber 46. This accounts for the minimum oil flow provided to the prior art vane motor.

Each pressure switch 44, 48 may comprise a momentary switch that is arranged to throw when pressure in the respective chamber 42, 46 is above a predetermined threshold pressure. Status data 52, 54 from each switch 44, 48 may be provided to the electronic load regulator 30. In various embodiments, the pressure switches 44, 48 may comprise normally open or normally closed switches, and the signal provided by the switches may be interpreted by the electronic load regulator 30.

In operation, the pressure sensor module 40 is designed to mimic a prior art vane motor's characteristics in response to the oil flow from the engine governor. Adequate oil flow in a first direction will cause a pressure in the first chamber 42 to be greater than the predetermined switch threshold pressure, while pressure in the second chamber 46 remains below the predetermined switch threshold pressure. This translates to a "thrown" signal from the first switch 44 and a "normal" signal from the second switch 48. The electronic load regulator 30 interprets this set of status data 52, 54 as an "increase" instruction and will increase the excitation current present in the electric generator field windings 16.

Adequate oil flow in the reverse direction will cause a pressure in the second chamber 46 to be greater than the predetermined switch threshold pressure, while pressure in the first chamber 42 remains below the predetermined switch threshold pressure. This translates to a "thrown" signal from the second switch 48 and a "normal" signal from the first switch 44. The electronic load regulator 30 interprets this set of status data 52, 54 as a "decrease" instruction and will decrease the excitation current present in the electric generator field windings 16.

In the event that both pressure switches 44, 48 send the same signal, i.e. both switches send a "normal" signal or both switches send a "thrown" signal, the electronic load regulator 30 will maintain the present amount of excitation current in the electric generator field windings 16. It should be noted that in some embodiments, the status data 52, 54 may comprise a digital signal which may correspond to normal/thrown, open/closed, 0/1, etc., and in some embodiments, the status data 52 may comprise an analog signal.

When the electronic load regulator 30 receives an increase instruction or a decrease instruction from the pressure sensor module 40, it will increase or decrease the excitation current at a predetermined ramp rate. The electrical current of the controlled power output 34 will be increased or decreased until both pressure switches 44, 48 of the pressure sensor module 40 send the same signal, wherein the present amount of excitation current will be maintained.

The electronic load regulator 30 may be configured to increase or decrease the excitation current at any suitable ramp rate. In some embodiments, the ramp rates may be set at nominal levels that substantially mimic the rate of change generally provided by the prior art vane motor. The nominal levels may be adjusted up or down as desired. In some embodiments, a nominal ramp rate may be approximately 2.5 volts per second.

In some embodiments, the increase ramp rate and the decrease ramp rate are adjustable independently from one another.

The electronic load regulator 30 may be configured to provide a short "bump" or temporary high ramp rate when the locomotive throttle control is moved from an OFF position to a first throttle position. The temporary high ramp is intended to mimic the operation of a prior art load regulator 5, wherein the excitation current jumps from zero to a predetermined amount instantaneously upon throttle engagement. The temporary high ramp may be any suitable ramp rate, such as 75 volts per second. Thus, upon the throttle entering the first throttle position, excitation current/voltage may be increased at the temporary high ramp until a predetermined voltage is reached, whereafter the electronic load regulator 30 will control the excitation current according to the normal ramp rates.

The temporary high ramp rate may also be used to configure the electronic load regulator 30 to provide a full excitation current during startup, which may be desirable depending upon the technology of the locomotive. When configured to provide full excitation at startup, the temporary high ramp rate will remain engaged until the full excitation current/voltage is achieved, whereafter the electronic load regulator 30 will control the excitation current according to the normal ramp rates.

In some embodiments, the electronic load regulator 30 may be configured to accept an input in order to mimic a prior art switcher service circuit 4 (see FIG. 1), and thus may include a switcher service input 36. The switcher service input 36 may be connected to the rheostat bypass switch 3 associated with the prior art regulation system 5 (see FIG. 1).

The bulk of the prior art switcher service circuit 4 may be removed, and the electronic load regulator 30 may be arranged to sense a signal on the switcher service input 36 and output the more immediate, higher predetermined amount of excitation current as associated with the prior art switcher service circuit 4.

The electronic load regulator 30 may further be programmed to provide any desired amount of excitation current upon operation of the bypass switch 3. In some embodiments, a nominal switcher service ramp rate may be approximately 4.5 volts per second. In some embodiments, operation of the switch 3 may change the increase ramp rate but will not affect the decrease ramp rate.

In some embodiments, fusing 24, a field enabling contactor 26 and other circuits 14 may be included between the electronic load regulator 30 and the source 18 or the generator field windings 16. This will often depend upon the technology of the locomotive into which the regulator system 20 is installed. The electronic load regulator 30 may also receive safety feedback information 12 which may be used to adjust the controlled output 34, for example by controlling the output 34 to a minimum excitation current.

Figure 3:
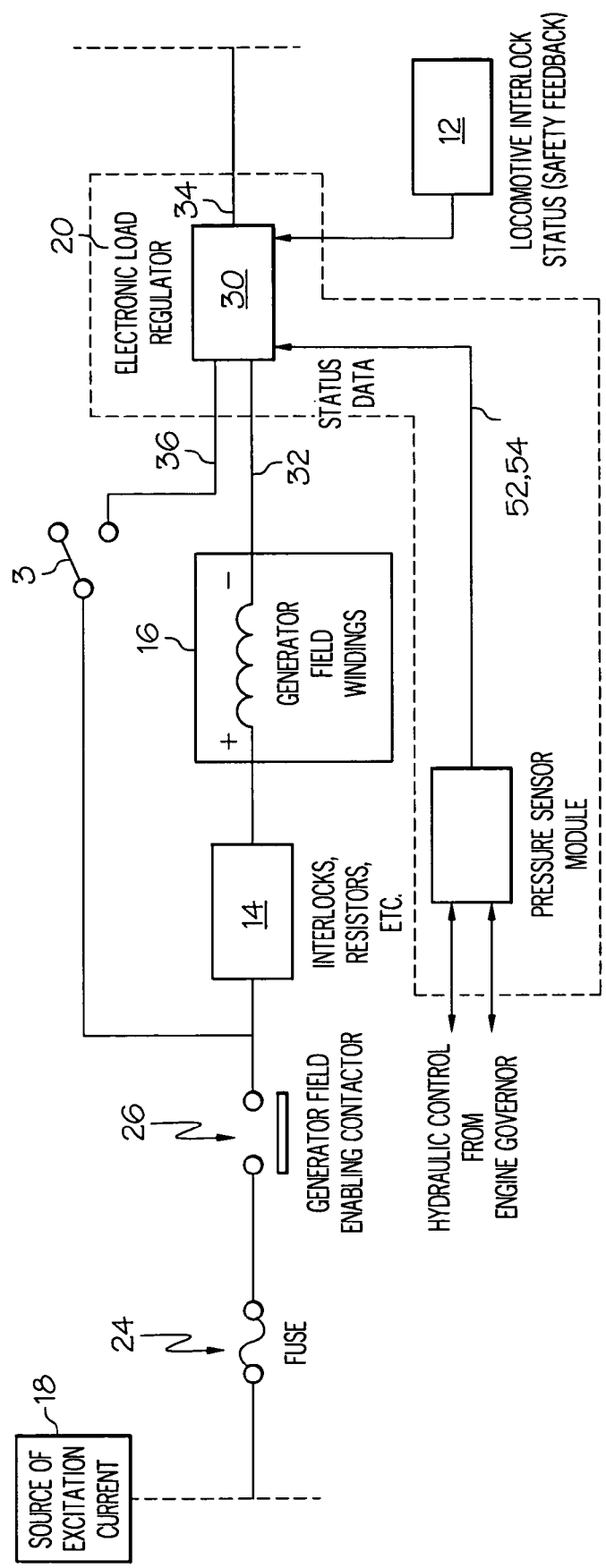
FIG. 3 shows another embodiment of an inventive load regulator system.

FIG. 3 shows another embodiment of a generator field control system 20 wherein the electronic load regulator 30 is installed on the negative side of the generator field windings 16. The electrical location of the electronic load regulator 30 may be selected depending on the specific generator field current drive technology, such as MOSFET or IGBT, of the generator that the electronic load regulator 30 will be used with.

Figure 4:
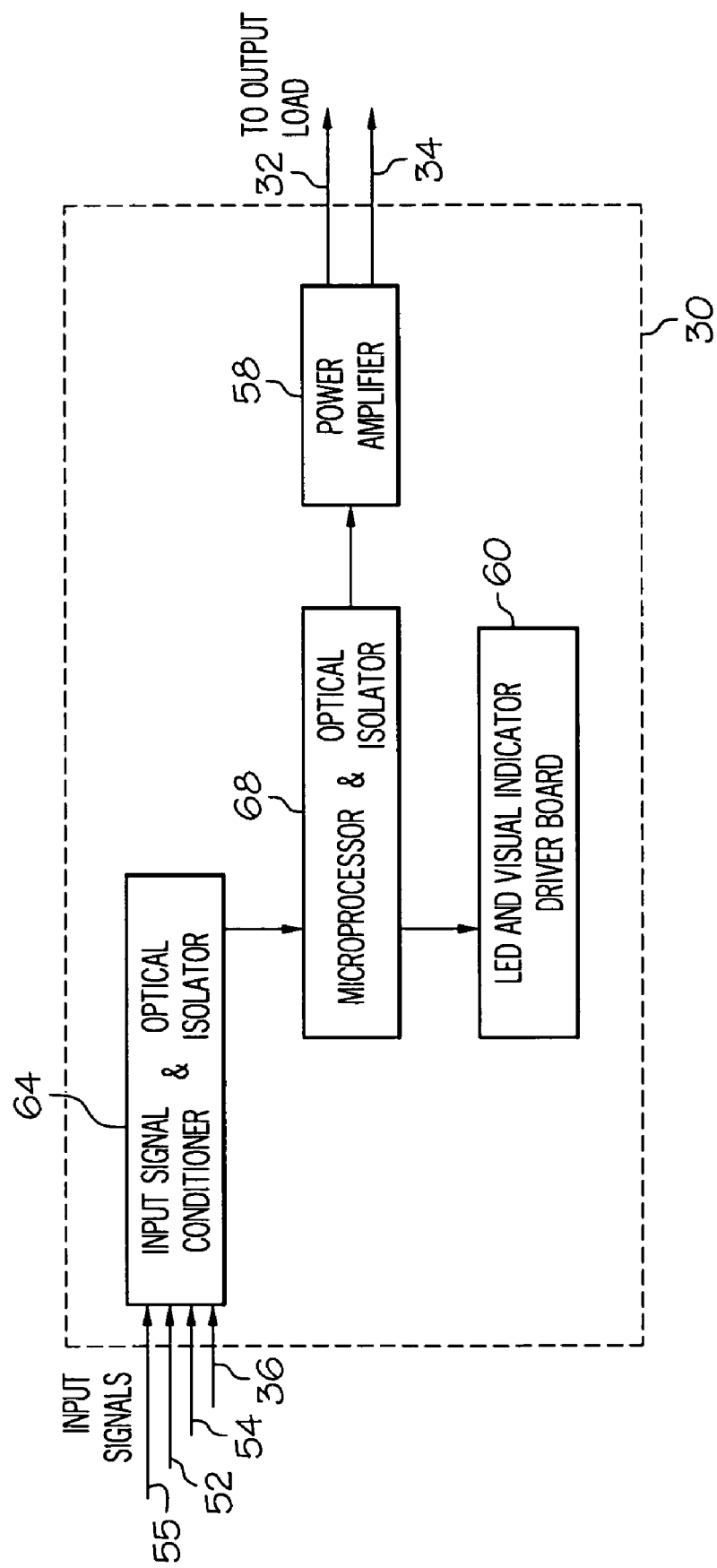
FIG. 4 shows a block diagram schematic for an embodiment of an electronic load regulator.

FIG. 4 shows a block diagram schematic for an embodiment of an electronic load regulator 30. The input signals, such as the pressure module 40 status data 52, 54, the switcher service input 36 and locomotive interlock status input 55, may be received by an input signal conditioner 64, which may also comprise an optical isolator. A microprocessor 68 in turn controls an amplifier 58 which outputs the controlled output 34.

A display 60 may display information and may include a plurality of indicator LEDs or any other suitable status indicators. For example, a status LED may be provided to indicate system power, first status data 52 (governor up), second status data 54 (governor down), switcher service 3 engagement and field enabling contactor 26 engagement. A bar graph, for example comprising a plurality of LED, may display the approximate excitation current output from a minimum to a maximum.

FIGS. 5-8 show electrical schematics for embodiments of selected internal components of an embodiment of an electronic load regulator 30, for example as represented by blocks in FIG. 4. It should be noted that many of the electrical traces shown schematically in FIG. 5-8 extend across the Figures.

Figure 5:
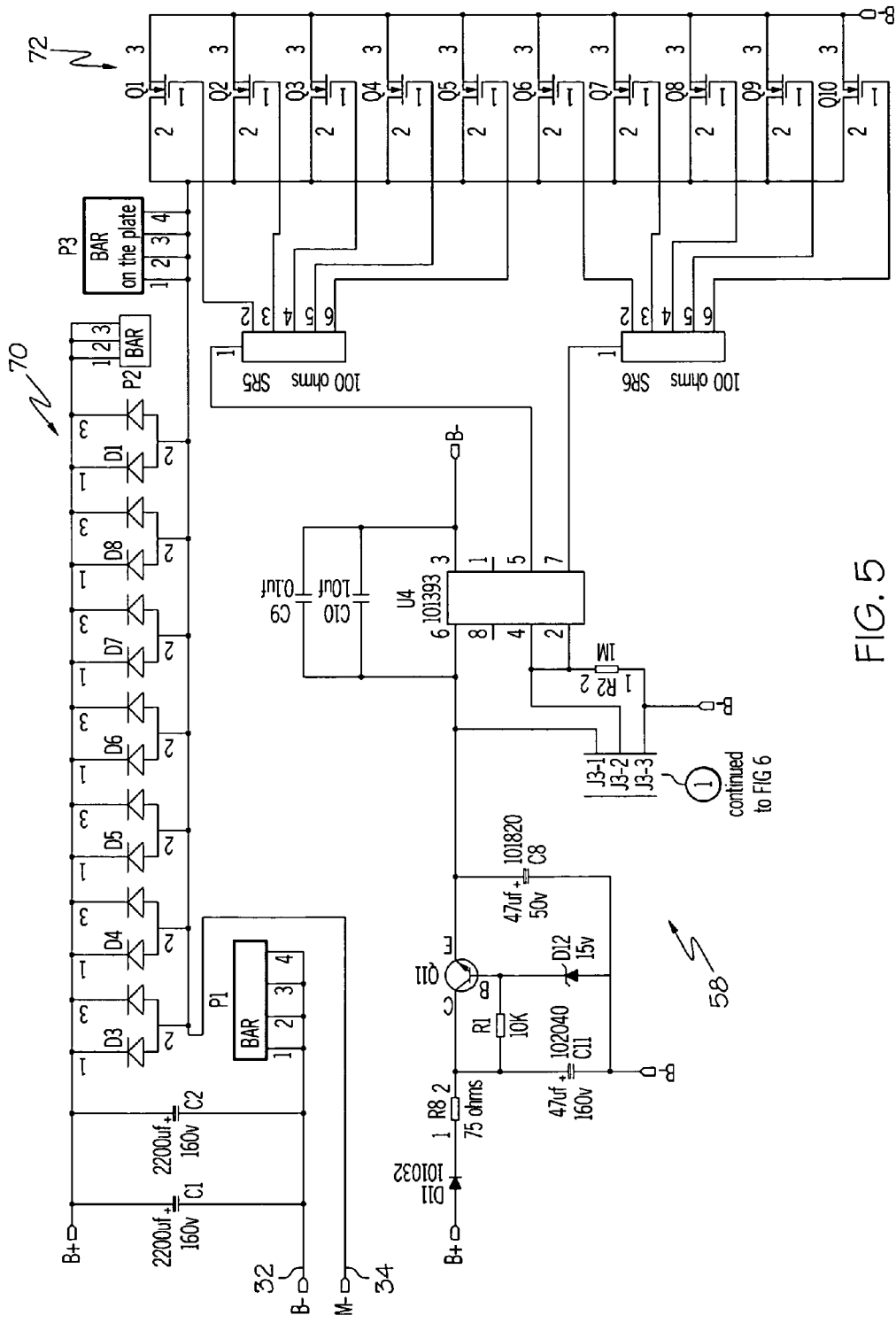
FIGS. 5-8 show electrical schematic diagrams for embodiments of internal components of an embodiment of an electronic load regulator.

FIG. 5 shows an electrical schematic for an embodiment of a power amplifier 58 which uses a MOSFET switching circuit. A power input 32 connection and the controlled output 34 connection are shown. A plurality of diodes 70 and MOSFETS 72 are also shown. The number of diodes 70 and MOSFETS 72 may be adjusted according to the total output required from the amplifier 58. In some embodiments, the controlled output 34 may output a Pulse Width Modulated (PWM) signal at a predetermined frequency, such as 20 kHz. The resulting excitation current is directly proportional to the duty cycle of the PWM signal.

Figure 6:
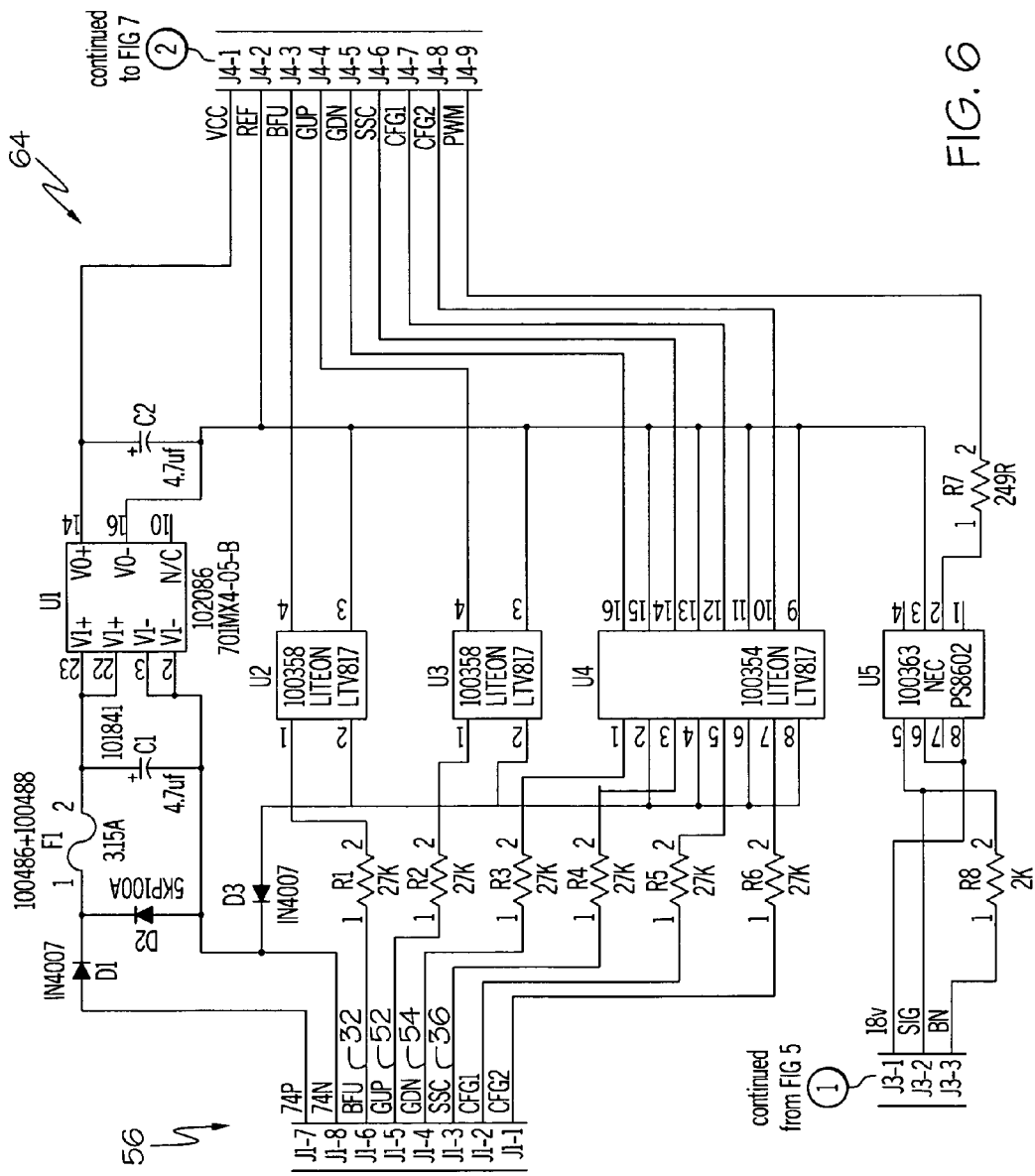

FIG. 6 shows an electrical schematic for an embodiment of an input signal conditioner 64. An input block 56 is shown where the input signal connections may be made, such as first status data 52 (governor up), second status data 54 (governor down), switcher service input 36 and a battery field up (BFU) connection. The BFU connection comprises an input that tells the electronic load regulator 30 the current voltage in the generator field windings, and may thus be connected to the power input 32, the source 18 or any other suitable portion of the power connections. Leads 74P and 74N are power connections for the electronic load regulator 30, which desirably operate at relatively low current levels.

Leads CFG1 and CFG2 comprise supplemental configuration and/or programming connections. By default, the leads CFG1, CFG2 may be unconnected. Alternatively, power may be supplied to either or both of the CFG1 and CFG2 leads, for example by connecting the desired lead(s) to the power connection 74P, in order to adjust the ramp rates. The following table shows example ramp rates for an embodiment of an electronic load regulator 30.

| CFG1 | CFG2 | Normal Ramp Rate | Switcher Service (SSC) Ramp Rate |
| --- | --- | --- | --- |
| Default | Default | 2.5 V/sec (default) | 4.5 V/sec (default) |
| Default | Connected to Power | 3.0 V/sec | 5.0 V/sec |
| Connected to Power | Default | 3.5 V/sec | 5.5 V/sec |
| Connected to Power | Connected to Power | 4.0 V/sec | 6.0 V/sec |

Figure 7:
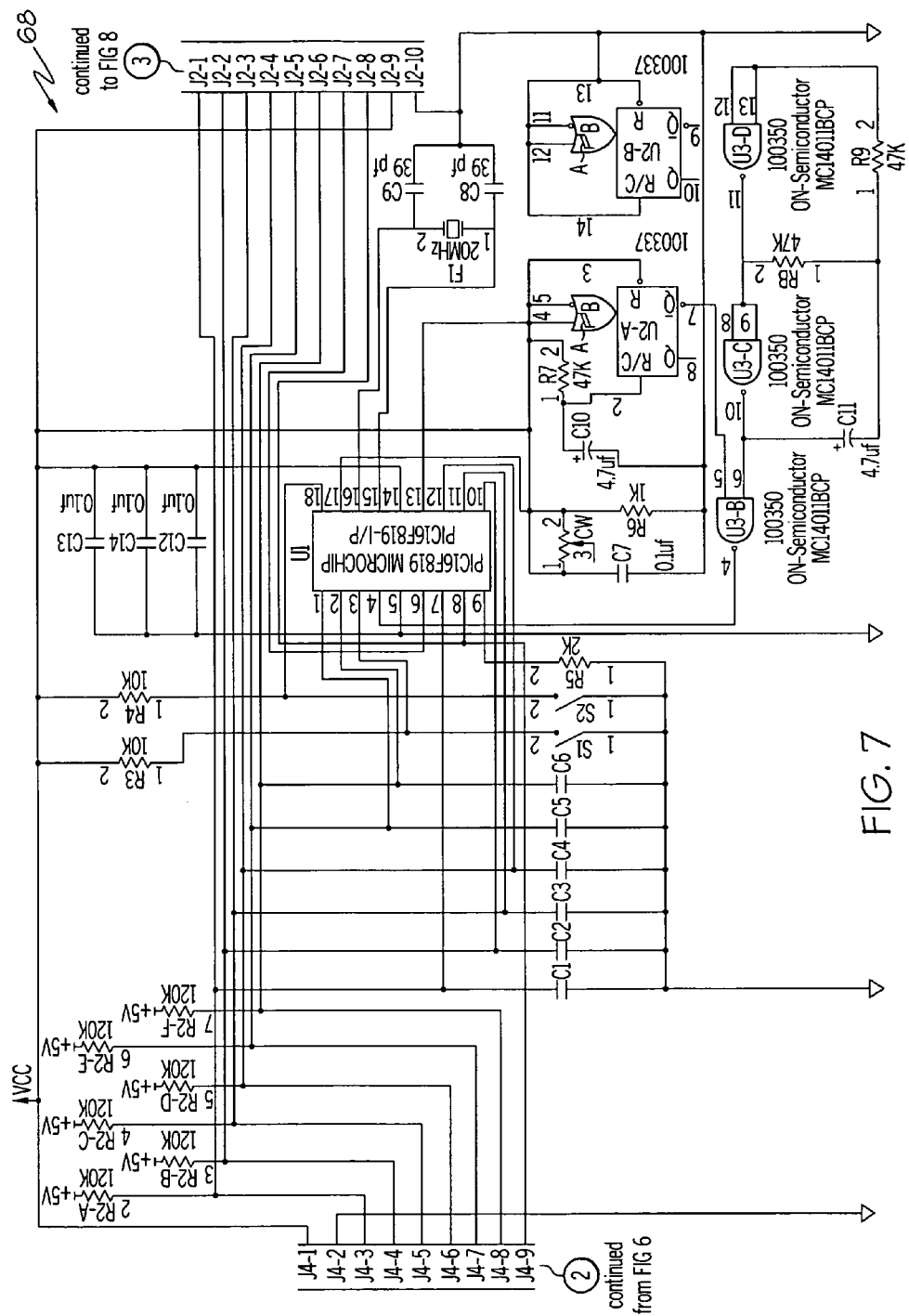

FIG. 7 shows an embodiment of a microprocessor and optical isolator.

Figure 8:
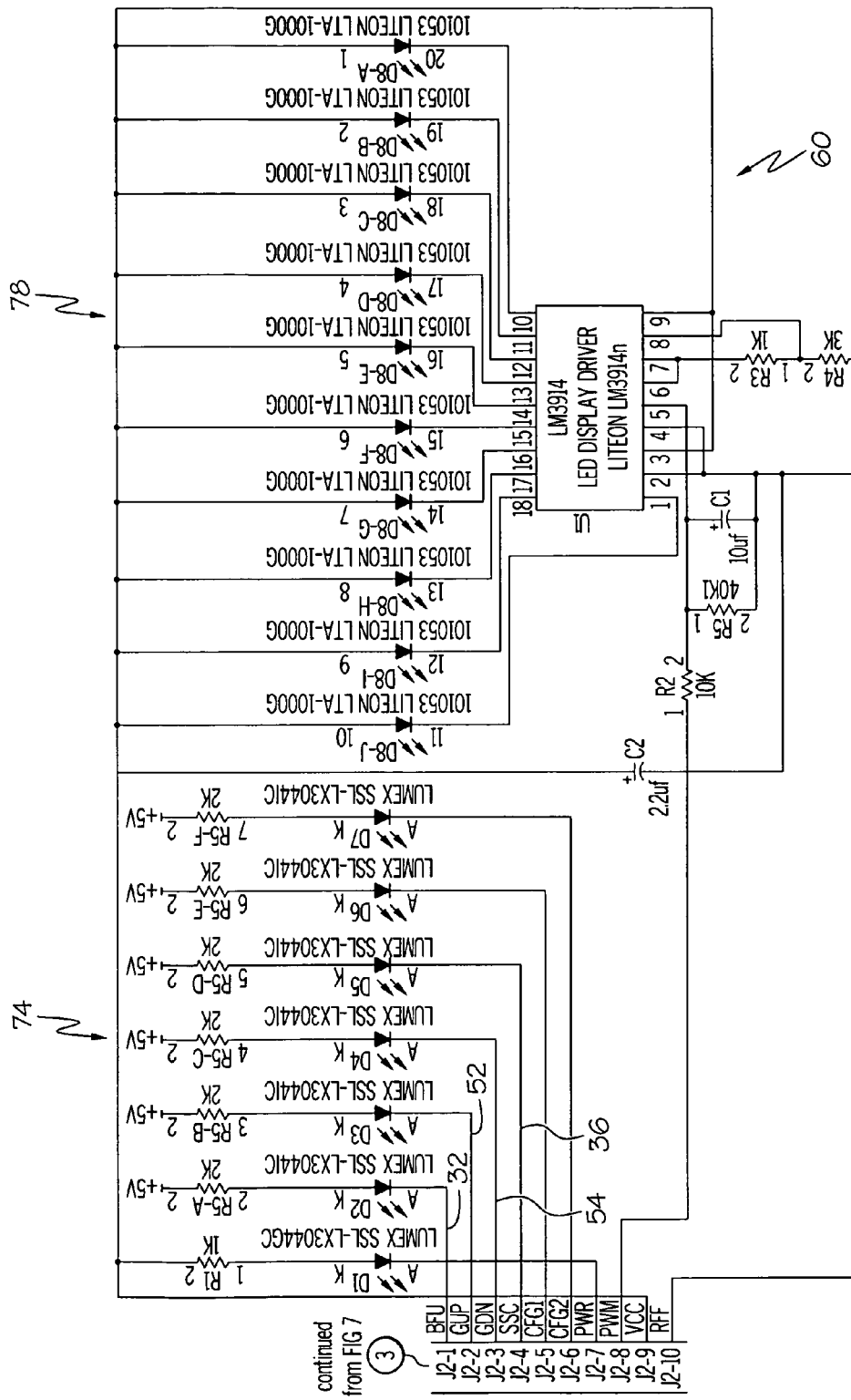

FIG. 8 shows an embodiment of a display. The display may include a first plurality of status indicators 74, such as LEDs or other suitable indicators, for displaying status data. The first plurality of status indicators 74 may include an individual status indicator for each input signal, such as the battery field input circuit 32, the first status data or GUP circuit 52, the second status data or GDN circuit 54, the switcher service SSC circuit 36, the CFG1 and CFG2 circuits, etc.

A second plurality of status indicators 78, such as LEDs or other suitable indicators, may be arranged to cooperatively display the approximate excitation output level of the electronic load regulator 30. The second plurality of status indicators 78 may be arranged, for example, to represent a bar graph.

Figure 9:
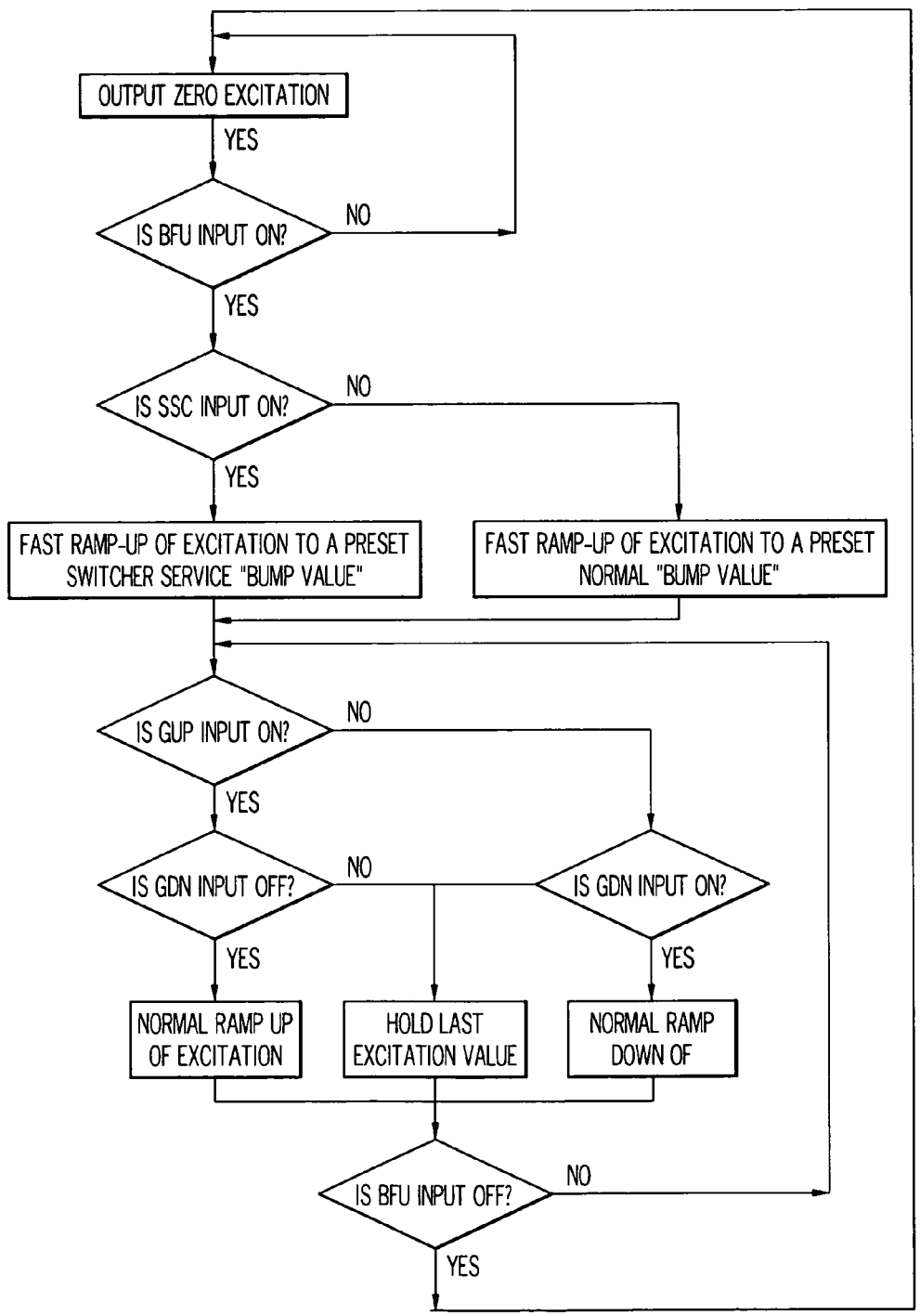
FIG. 9 shows a flowchart for an embodiment of the logic control programming for an embodiment of an electronic load regulator.

FIG. 9 shows a flowchart for an embodiment of the logic control for the electronic load regulator 30.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. An electronic load regulator system comprising:
   a pressure sensor device arranged to output status data; and
   an electronic load regulator comprising a power input, a status data input and a controlled power output;
   wherein status data from the pressure sensor device is provided to the electronic load regulator, and the electronic load regulator adjusts the controlled power output according to the status data.

2. The electronic load regulator system of claim 1, wherein the status data input comprises a first signal circuit and a second signal circuit.

3. The electronic load regulator system of claim 2, wherein the controlled power output level is increased when the first signal circuit is on and the second signal circuit is off.

4. The electronic load regulator system of claim 2, wherein the controlled power output level is decreased when the first signal circuit is off and the second signal circuit is on.

5. The electronic load regulator system of claim 2, wherein the controlled power output level is held constant when the first signal circuit and the second signal circuit are both on or both off.

6. The electronic load regulator system of claim 2, wherein the pressure sensor device comprises a first pressure switch and a second pressure switch, the first pressure switch arranged to control the first signal circuit, the second pressure switch arranged to control the second signal circuit.

7. The electronic load regulator system of claim 6, wherein the pressure sensor device further comprises a first chamber and a second chamber, wherein the first switch is arranged to be operated by pressure in the first chamber and the second switch is arranged to be operated by pressure in the second chamber.

8. The electronic load regulator system of claim 7, wherein the pressure sensor device further comprises a pressure relief aperture that allows fluid communication between the first chamber and the second chamber.

9. The electronic load regulator system of claim 1, wherein the controlled power output level is adjusted at a predetermined ramp rate.

10. The electronic load regulator system of claim 9, the electronic load regulator further comprising a configuration circuit, wherein connection of the configuration circuit adjusts the predetermined ramp rate from a default ramp rate to a custom ramp rate.

11. The electronic load regulator system of claim 10, the electronic load regulator further comprising a switcher service input circuit, wherein connection of the switcher service input circuit increases the ramp rate from the default ramp rate to a higher switcher service ramp rate, or from the custom ramp rate to a higher custom switcher service ramp rate.

12. The electronic load regulator system of claim 10, the configuration circuit comprising a first configuration input and a second configuration input, wherein connection of only the first configuration input results in a first custom ramp up rate which is higher than the default ramp up rate; wherein connection of only the second configuration input results in a second custom ramp up rate which is higher than said first custom ramp up rate; and wherein connection of both the first configuration input and the second configuration input results in a third custom ramp up rate which is higher than said second custom ramp up rate.

13. The electronic load regulator system of claim 1, wherein the controlled power output is electrically connected to field windings of an electric generator.

14. The electronic load regulator system of claim 1, wherein the pressure sensor device is connected to hydraulic lines from an engine governor.

15. The electronic load regulator system of claim 1, the electronic load regulator further comprising a switcher service input circuit, wherein connection of the switcher service input circuit causes faster adjustment of the controlled power output.

16. The electronic load regulator system of claim 1, wherein the controlled power output comprises a pulse width modulated signal.

* * * * *